US008438141B2

(12) United States Patent
Fish et al.

(10) Patent No.: US 8,438,141 B2
(45) Date of Patent: *May 7, 2013

(54) SYSTEM AND METHOD FOR PROVIDING SECURE ACCESS TO DATA WITH USER DEFINED TABLE FUNCTIONS

(75) Inventors: Douglas R. Fish, Rochester, MN (US); Hoa T. Tran, Rochester, MN (US); David A. Wall, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 2124 days.

This patent is subject to a terminal disclaimer.

(21) Appl. No.: 11/044,747

(22) Filed: Jan. 27, 2005

(65) Prior Publication Data

US 2006/0167850 A1 Jul. 27, 2006

(51) Int. Cl.
*G06F 17/00* (2006.01)

(52) U.S. Cl.
USPC .......................... 707/702; 707/769; 707/796

(58) Field of Classification Search ............... 707/1, 10, 707/100–102, 104.1, 702, 769, 796, E17.069, 707/E17.014, 763, 803, 955, 999.101, 999.102, 707/999.1
See application file for complete search history.

(56) References Cited

U.S. PATENT DOCUMENTS

| 6,021,410 | A | 2/2000 | Choy | |
|---|---|---|---|---|
| 6,366,934 | B1 | 4/2002 | Cheng et al. | |
| 6,374,238 | B1 * | 4/2002 | Iwata et al. | 707/769 |
| 6,466,934 | B2 | 10/2002 | Seese et al. | |
| 6,519,597 | B1 | 2/2003 | Cheng et al. | |
| 6,564,203 | B1 * | 5/2003 | Krishnaprasad et al. | 707/702 |
| 6,708,186 | B1 * | 3/2004 | Claborn et al. | 707/754 |
| 6,938,044 | B1 * | 8/2005 | Milby | 707/100 |
| 7,788,282 | B2 * | 8/2010 | Shekar | 707/796 |
| 8,090,942 | B2 | 1/2012 | Peterson | |
| 8,224,859 | B2 * | 7/2012 | Guyan et al. | 707/791 |
| 8,271,463 | B2 * | 9/2012 | Fish et al. | 707/702 |
| 2004/0059706 | A1 * | 3/2004 | Abelite | 707/1 |
| 2004/0267766 | A1 * | 12/2004 | Marek et al. | 707/100 |
| 2005/0177570 | A1 * | 8/2005 | Dutta et al. | 707/9 |
| 2005/0210023 | A1 | 9/2005 | Barrera et al. | |
| 2005/0283465 | A1 * | 12/2005 | Dettinger et al. | 707/3 |
| 2006/0080289 | A1 * | 4/2006 | Brunswig et al. | 707/3 |
| 2006/0143167 | A1 | 6/2006 | Fish et al. | |
| 2006/0167850 | A1 * | 7/2006 | Fish et al. | 707/3 |
| 2010/0166309 | A1 * | 7/2010 | Hull et al. | 707/E17.014 |
| 2010/0332526 | A1 | 12/2010 | Nori et al. | |

OTHER PUBLICATIONS

Pirahesh et al.—"Heterogeneous Query Processing through SQL Table Functions"—This paper appears in: Data Engineering, 1999. Proceedings., 15th International Conference on Date of Conference: Mar. 23-26, 1999—(pp. 366-373).*

(Continued)

*Primary Examiner* — Anh Ly (74) *Attorney, Agent, or Firm* — Patterson & Sheridan, LLP (57) ABSTRACT

Methods, systems and articles of manufacture are disclosed for providing secure access to data. Public UDTFs, private UDTFs and a metadata processor are utilized to facilitate secure access to data residing in a variety of data repositories.

7 Claims, 5 Drawing Sheets

OTHER PUBLICATIONS

Berthold Reinwald and Hamid Pirahesh—"SQL Open Heterogeneous Data Access"—Proceeding SIGMOD '98 Proceedings of the 1998 ACM SIGMOD international conference on Management of data—pp. 506-507.*

U.S. Appl. No. 11/023,678, filed Dec. 28, 2004, entitled "System and Method for Providing Access to Data With User Defined Table Functions".

Haas et al., "Extensible Query Processing in Starbust", Sigmod '89 Proceedings of the 1989 ACM SIGMOD International Conference on Management of Data, Jun. 1989, pp. 377-388, vol. 18 Issue 2, Association for Computing Machinery, New York, USA.

Hergula et al., "A Middleware Approach for Combining Heterogeneous Data Sources—Integration of Generic Query and Predefined Function Access", WISE '00 Proceedings of the First International Conference on Web Information Systems Engineering, Jun. 2000, pp. 26-33, vol. 1, IEEE Computer Society, Washington D.C. USA.

U.S. Appl. No. 13/659,124, entitled "Providing Secure Access to Data With User Defined Table Functions", filed Oct. 24, 2012.

U.S. Appl. No. 13/549,783, entitled "Providing Access to Data With User Defined Table Functions", filed Jul. 16, 2012.

* cited by examiner

SYSTEM AND METHOD FOR PROVIDING SECURE ACCESS TO DATA WITH USER DEFINED TABLE FUNCTIONS

BACKGROUND OF THE INVENTION

1. Field of the Invention

The present invention generally relates to data processing and more particularly to providing secure access to data in data repositories with a system comprising user defined table functions (UDTFs) and a metadata processor.

2. Description of the Related Art

Data repositories are subject oriented, integrated, time-variant collections of relatively large volumes of transactional and archived data that facilitate decision support services. Data repositories are often implemented as databases that are managed by database management systems. Databases are computerized information storage and retrieval systems. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses. Data repositories may also be implemented as simply a collection of text files that are formatted according to a particular protocol. Alternatively, data repositories may also be implemented as XML based databases.

A relational database management system (RDBMS) is a database management system that manages relational databases and is capable of storing and retrieving large volumes of data. Further, large scale relational database management systems can be implemented to support thousands of users accessing databases via a wide assortment of applications. An RDBMS can be structured to support a variety of different types of operations for a requesting entity (e.g., an application, the operating system or an end user). Such operations can be configured to retrieve, add, modify and delete data being stored and managed by the RDBMS. Standard database access methods support these operations using high-level query languages, such as the Structured Query Language (SQL). One of the primary operations performed with SQL is querying (also referred to herein as retrieving or selecting) data from data structures within a database.

The standard manner of retrieving data from a relational database is by directly querying the data structures in which the data resides. In the case of relational databases, these data structures may be tables or indexes. However, for a variety of reasons including those pertaining to security and optimal system performance, it is not preferred to allow database users to directly access database objects (particularly tables) in order to retrieve data. Often, security capabilities of a database system are not sufficient for environments serving subsets of users with disparate privileges to the data. Database systems typically do not supply security down to the row level or column level of a table, for example. Row-level security allows for limiting access to data residing in a particular row based on the database user's privileges to that particular row of a table—privileges are provided on a row by row basis. Similarly, cell-level security allows for limiting access to data residing in particular column of a particular row of table; accordingly, user privileges would have to be established on a cell by cell basis.

In some cases the application layer may be configured to provide additional security functionality (such as row-level and cell-level security) on top of what is supplied by the database system. An application may, for example, add terms to a user's query to make sure the user sees only data the user is entitled to see. While implementing application-based security logic is an approach that is commonly used, a significant problem remains regarding the implementation and enforcement of uniform security policies across multiple applications.

An alternative approach for providing secure access to data is to utilize user defined table functions (UDTFs). UDTFs, like database views, are programmatically defined objects that directly reference database tables and appear to users of an RDBMS to be conventional tables. UDTFs can be based on a query or other appropriate logic and return a two-dimensional array structure as though it were a set of rows and columns, thereby allowing RDBMS users to utilize the UDTF as though it were a table. When referenced (or "called"), UDTFs are configured to execute a query that retrieves data from underlying tables and then provide the retrieved data as an array. With a UDTF, it is possible to treat data stored in proprietary file systems, data returned from an API or data generated by a program, as a table. In addition, in certain environments, UDTFs may be used to precompute and provide aggregated representations of base data. They can also be used to precompute joins between two or more tables, with or without aggregations. In many instances, a UDTF optimizes resource usage associated with expensive joins and aggregations for queries involving large volumes of data spread across multiple data structures in a distributed database environment.

Additionally, UDTFs can be used to create an abstraction layer between database users and the actual database tables being selected. Abstraction layers can be used to provide additional security by providing a strictly controlled manner in which data can be retrieved from a database. Further, a UDTF based abstraction layer can be used to provide users with the ability to query data that is sourced from multiple tables belonging to multiple schemas and residing in multiple databases without the user requiring detailed knowledge of the physical layout of the distributed database environment.

In order to maximize the benefit from the functionality described above, distinct UDTFs can be created to represent each table within a distributed database environment. Those skilled in the art will acknowledge, however, that tables exist in wide variety of forms and have vastly different attributes. For instance, in terms of the number of columns, certain tables may be configured with five columns while others may be configured with ninety columns. One problem with using UDTFs is that, as conventionally implemented, each respective UDTF would require a unique query defined to properly retrieve data from the underlying tables. Therefore, during the handling of a query request, for each UDTF referenced, a unique piece of code utilized for coupling the respective UDTF to a corresponding table would have to be invoked to provide the necessary results. This is a resource intensive and inefficient solution for utilizing UDTFs in a distributed database environment.

Another problem is that, as conventionally defined, UDTFs are dependent on the physical structure of the database remaining stable. In other words, the table and column definitions on which a UDTF depends, should not change. Currently, a UDTF typically needs to be re-defined if the underlying objects referenced by UDTF are changed.

Therefore, there is a need for an improved system and method for defining and using UDTFs. There is a further need for the solution to interface with and support applications that are configured to retrieve data from the repository directly.

There is yet a further need for the solution to provide secure access to data and provide row-level security and column-level security.

SUMMARY OF THE INVENTION

One embodiment provides a computer implemented method including receiving a first query that is created by a user, and which references a first user-defined table function (UDTF) and responsive to the received first query, calling the referenced first user-defined table function. A second user-defined table function referenced by the called first user-defined table function is then called. A second query is submitted to gather attributes comprising security attributes of the user and attributes of the called second UDTF. A third query is submitted to query a table based on the gathered attributes.

Another embodiment provides a computer implemented method includes providing a calling application that submits a first query which is created by a user, receiving the first query, which references a first user-defined table function (UDTF) and responsive to the received first query, calling the referenced first UDTF. The method further includes calling a second user-defined table function referenced by the called first UDTF and calling a metadata processor referenced by the called second UDTF for performing operations related to providing data to the second UDTF. The operations include submitting a second query to gather attributes comprising security attributes of the user and attributes of the second UDTF, receiving query results which correspond to the second query, using the query results, forming a third query to query a table based on the attributes, including the security attributes of the user and attributes of the second UDTF, and providing query results which correspond to the third query to the second UDTF.

Yet another embodiment provides a data processing system for retrieving data including a first user-defined table function (UDTF) referenceable by a database user in the form of a query; a second UDTF referenced by the first UDTF; a metadata processor referenced by the second UDTF and configured to query a security table which contains data representing user privileges to data; and a data structure queried by the metadata processor to retrieve data responsive to the query.

Still another embodiment provides a data processing system for retrieving data, including a first user-defined table function (UDTF) referenceable by a database user in the form of a query and a second UDTF referenced by the first UDTF. The first user-defined table function (UDTF) is accessible by users and exposes columns the users may query. A metadata processor referenced by the second UDTF is configured to query a security table which contains data representing user privileges to data contained in a data structure. The metadata processor is configured to retrieve the data, responsive to the query.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention is generally directed to methods, systems and articles of manufacture for providing secure access to data within data repositories. Public UDTFs, private UDTFs and a metadata processor are employed to provide secure access to data residing in a variety of data repositories, such as relational databases.

In the following, reference is made to embodiments of the invention. The invention is not, however, limited to specific described embodiments. Instead, any combination of the following features and elements, whether related to different embodiments or not, is contemplated to implement and practice the invention. Furthermore, in various embodiments the invention provides numerous advantages over the prior art. Although embodiments of the invention may achieve advantages over other possible solutions or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in the claims. Similarly, reference to "the invention" shall not be construed as a generalization of any inventive subject matter disclosed herein and shall not be considered to be an element or limitation of the appended claims, except where explicitly recited in a specific claim.

As used herein, the term "user" may generally apply to any entity utilizing the data processing system described herein, such as a person (e.g., an individual) interacting with an application program or an application program itself, for example, performing automated tasks. While the following description may refer to a graphical user interface (GUI) intended to present information to and receive information from a person, it should be understood that in many cases, the same functionality may be provided through a non-graphical user interface, such as a command line and, further, similar information may be exchanged with a non-person user via a programming interface.

As used herein, the term relational database generally refers to a collection of data arranged for ease and speed of search and retrieval. Further, a relational database comprises logical and physical structures managed by a relational database management system (RDBMS).

Data Processing Environment

One embodiment of the invention is implemented as a program product for use with a computer system. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Embodiments of the invention can be implemented in a hardware/software configuration including at least one networked client computer and at least one server computer. Furthermore, embodiments of the present invention can apply to any comparable hardware configuration, regardless of whether the computer systems are complicated, multi-user computing apparatus, single-user workstations, or network appliances that do not have non-volatile storage of their own. Further, it is understood that while reference may be made to particular query languages, including SQL, the invention is not limited to a particular language, standard or version. Accordingly, persons skilled in the art will recognize that the invention is adaptable to other query languages and that the invention is also adaptable to future changes in a particular query language as well as to other query languages presently unknown. Likewise, reference to specific programming languages is merely illustrative and not limiting of the invention.

PREFERRED EMBODIMENTS

Figure 1:
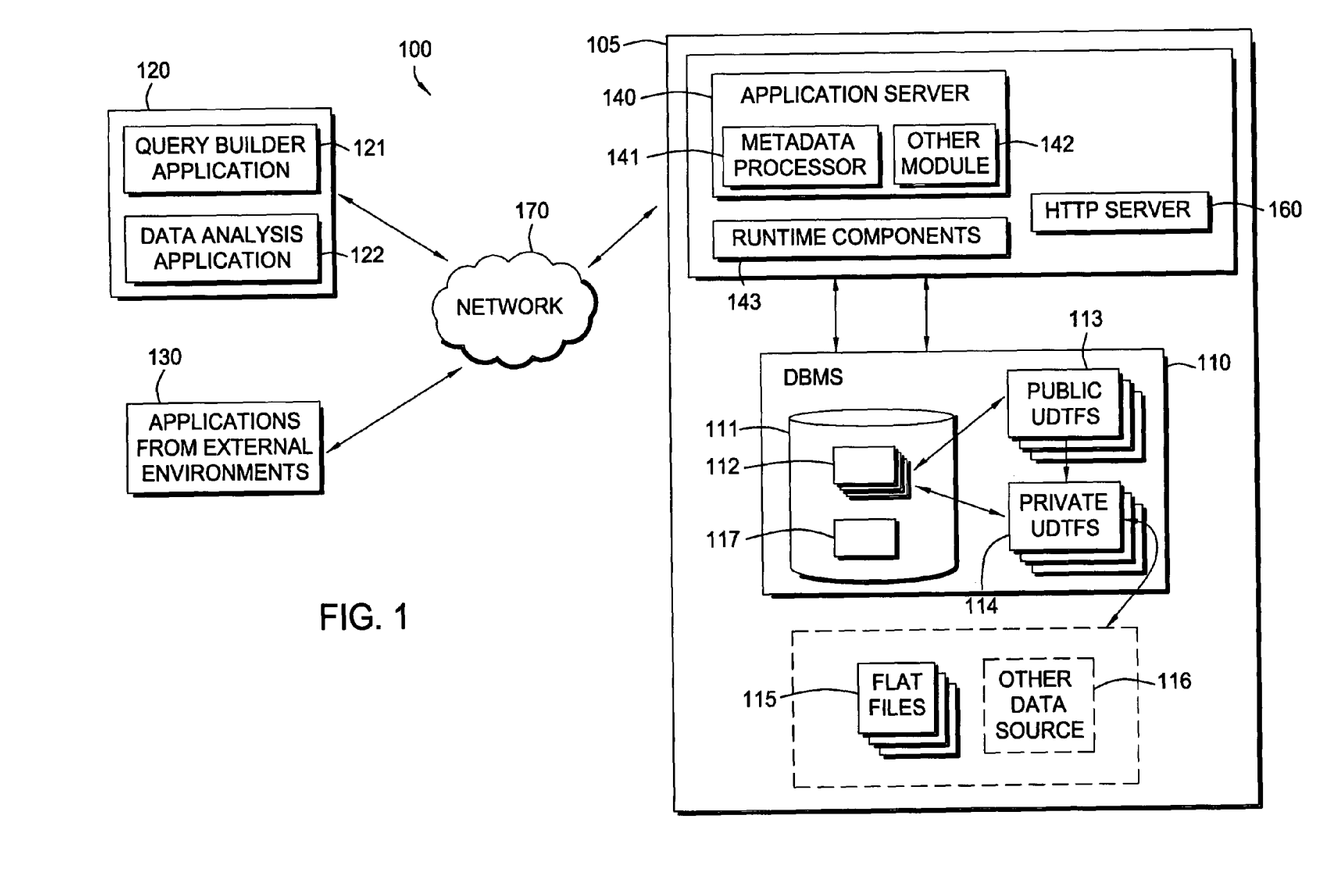
FIG. 1 is a computer system illustratively utilized in accordance with one embodiment of the invention.

Referring now to FIG. 1, a relational view of components in one embodiment of a processing environment 100 is illustrated. Generally, the components shown in FIG. 1 may be implemented in any combination of software and/or hardware. The processing environment 100 includes a hardware server 105, an application server 140, one or more application runtime components 143 and a HTTP server 160. All the aforementioned components of the processing environment 100 are linked via a network 170, which may be the Internet 170.

The system 100 also includes a relational database management system (RDBMS) 110 that manages one or more relational databases 111. Data resides in relational tables 112 within the database 111. According to embodiments of the present invention, user defined table functions (UDTFs) are used for providing access to the data. It should be noted that in one embodiment of the present invention, UDTFs are registered within the RDBMS and are managed by the RDBMS.

To users (e.g., calling programs) of the RDBMS, UDTFs appear as conventional tables and can be accessed in the same manner in which conventional tables are accessed.

In particular embodiments, UDTFs can be SQL based or Java® based. For a SQL based UDTF, any data manipulation logic is defined in SQL, whereas Java® based UDTFs have the logic defined in the Java® programming language. A SQL based UDTF may be based on a query against one or more database tables, while Java® based UDTFs may utilize program modules, which may be internal or external to the system 100, for providing required functionality.

In one embodiment, two types of UDTFs are provided: public UDTFs 113 and private UDTFs 114. Public UDTFs 113 are accessible and referenced by all users of the system 100. Private UDTFs 114, on the other hand, are only available to particular users of the system that have the required privileges. According to one embodiment, the management of access rights concerning UDTFs generally follows the methodology for creating and managing access rights for public and private database objects, such as tables and views, in a relational database environment—this methodology is well known by those skilled in the art. It should be noted that, as described herein with respect to a particular embodiment, all UDTFs are registered within the RDBMS and managed by the RDBMS.

As configured in the system according to embodiments of the present invention, public UDTFs 113 are utilized to form an abstraction layer and provide an interface to RDBMS users. They represent the access point to data that is of interest, and are perceived to be tables in which the data is stored. The discussion below will show that public UDTFs 113 are relatively non-complex structures that are defined based on a simple query against private UDTFs 114, similar to the manner in which database views are defined based on a query against underlying tables.

All Private UDTFs 114 are created based on a master UDTF, which is essentially a template. In a particular embodiment, the number of columns the master UDTF and the private UDTFs 114 have is dictated by the particular database management system being utilized. For example, in a particular implementation IBM's DB2® RDBMS is utilized, and this database allows for tables to have up to ninety columns. Accordingly, the master UDTF and all private UDTFs 114 would have ninety columns that are of the string datatype. Unlike public UDTFs 113, private UDTFs 114 are not simply based on a query against other objects in the system 100. Rather, they invoke a program (e.g., a Java® program), the metadata processor 141, to form a suitable query that will directly access underlying objects and return data to the private UDTF. While one embodiment of the present invention is implemented using Java®, those skilled in the art will recognize the methods described herein may be used with other object oriented languages including C++.

The metadata processor is implemented as a Java® module that is configured to interface with the private UDTFs. The metadata processor utilizes information about the private UDTF that is stored in the metadata table 117 to construct a suitable query against underlying tables. Upon receiving the query results, the metadata processor transfers the resultant data set to the private UDTF. Operations related to the metadata processor are described in more detail with reference to FIG. 4.

In one aspect, the ability to utilize the same number of columns for all private UDTFs, thereby standardizing all private UDTFs, and the ability to invoke only one piece of code (the metadata processor) to form suitable queries for any private UDTF provides a simple and effective approach to utilizing UDTFs in a distributed database environment. Using this approach, a single piece of code is used to couple all private UDTFs with their corresponding underlying tables.

Referring back to FIG. 1, in addition to relational databases 110, data may also be retrieved from external data sources, such as flat files 115 and any other suitable sources 116. The flat files may be formatted in adherence to various well known formats, such as XML. UDTFs may be used to represent these alternative data sources in the same manner that they represent relational tables. The relationship between the various software components listed above are described in more detail with reference to FIG. 2.

Figure 2:
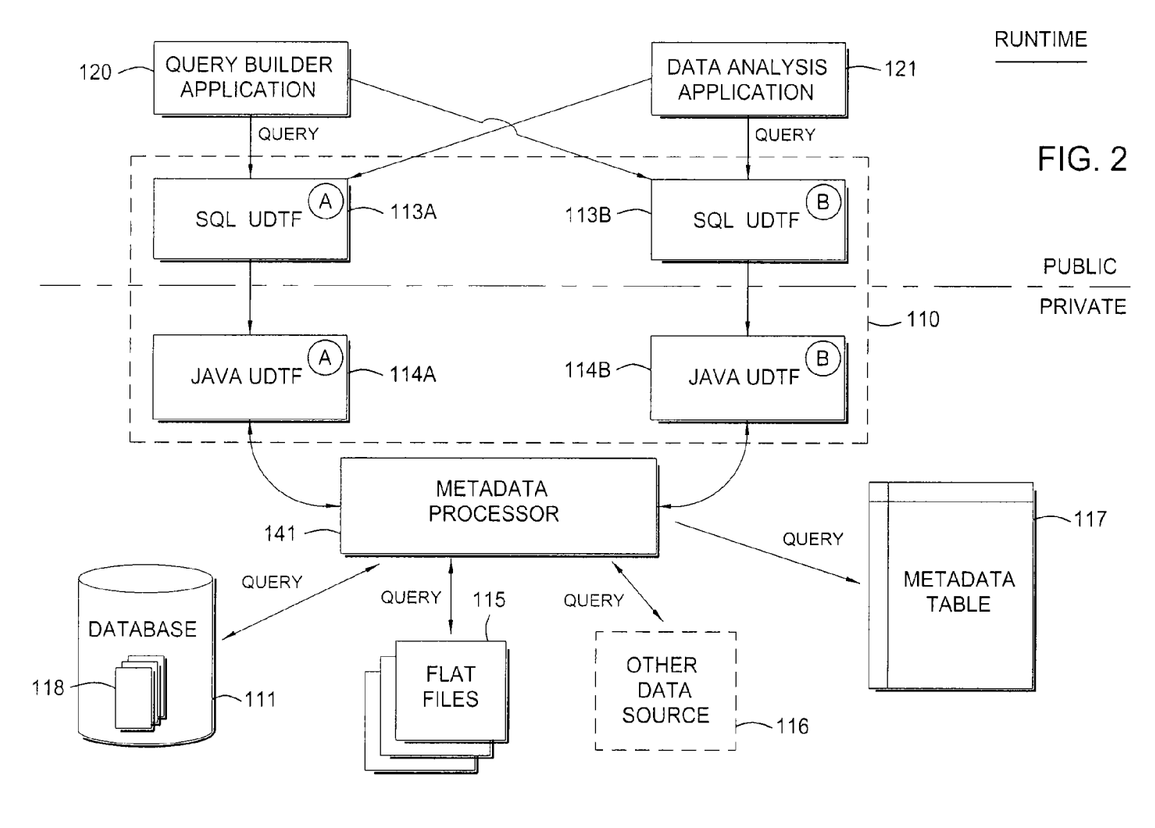
FIG. 2 is a relational view of software components according to one embodiment of the invention.

FIG. 2 is a relational view of software components configured to handle a query request, according to one embodiment of the invention. As shown in FIG. 2, a query builder application 120, data analysis application 121, or any other appropriate application may submit a query request to the DBMS 110. The requesting applications (i.e., RDBMS users) may be referencing particular objects that appear to be conventional tables and they may be oblivious to the fact that the referenced objects are UDTFs. In this manner, the type of underlying objects (e.g., tables, views, other UDTFs, etc.) is abstracted from RDBMS users.

According to embodiments of the current invention, FIG. 2 illustrates that the requests are directed to public UDTFs 113. The public UDTFs 113, in turn, reference private UDTFs 114. In one embodiment, public UDTFs are SQL based and private UDTFs are Java® based. The reference by a particular public UDTF 113 to a particular private UDTF is dictated by the definition of the public UDTF 113. For instance, consider the definition of an exemplary public UDTF, shown below in TABLE 1:

TABLE 1

Definition of Exemplary Public UDTF

| 001 | CREATE FUNCTION SCORES_PUBLIC( ) |
| 002 | RETURNS TABLE (ID INTEGER, |
| 003 | NAME VARCHAR(255), |
| 004 | SCORE INTEGER) |
| 005 | LANGUAGE SQL |
| 006 | RETURN |
| 007 | SELECT INTEGER(SCORES_PRIVATE.ID), |
| 008 | SCORES_PRIVATE.NAME, |
| 009 | INTEGER(SCORES_PRIVATE.SCORE) |
| 010 | FROM SCORES_PRIVATE( ) |

As seen in lines 001-010 of Table 1 above, the UDTF "SCORES_PUBLIC" is being defined (or registered) in the database. As its name implies, this is a public UDTF, and it is configured to reference the "SCORES_PRIVATE" UDTF, as specified in line 010. Accordingly, when referenced by a requesting application for a particular query, the "SCORES_PUBLIC" UDTF relays the request to "SCORES_PRIVATE".

All private UDTFs are created based on a master UDTF, which serves as a template for private UDTFs. One embodiment of the present invention is configured to be implemented in an environment employing the IBM DB2® relational database, although any database environment is contemplated. The DB2® platform supports ninety columns for each table—in other words, a relational table may be ninety columns wide. Accordingly, the master UDTF is configured to accommodate ninety columns. Table 2, shown below, provides an exemplary definition for the "SCORES_PRIVATE" UDTF created using the master UDTF template according to one embodiment of the present invention. Lines 002-091 in Table 2 correspond to the aforementioned ninety columns. It should be noted that only three columns are used (ID, NAME and SCORE), but in order to maintain the standard profile provided by the master UDTF, eighty seven null columns (DONOTUSE1-DONOTUSE87) serve as placeholders.

TABLE 2

Definition of Exemplary Private UDTF

| 001 | CREATE FUNCTION SCORES_PRIVATE( ) |
| 002 | RETURNS TABLE(ID VARCHAR(5), |
| 003 | NAME VARCHAR(255), |
| 004 | SCORE VARCHAR(5), |
| 005 | DONOTUSE1 VARCHAR(1), |
| 006 | DONOTUSE2 VARCHAR(1), |
| 007 | DONOTUSE3 VARCHAR(1), |
| ... | ... |
| 091 | DONOTUSE87 VARCHAR(1)) |
| 092 | EXTERNAL NAME 'metadata_processor.TF1' |
| 093 | LANGUAGE JAVA |
| 094 | PARAMETER STYLE DB2GENERAL |
| 095 | NOT DETERMINISTIC |

Line 092 of Table 2 shows that the private UDTF references the metadata processor 141. The metadata processor 141 is what directly queries the database (or the data source). The metadata processor 141 utilizes the metadata table 117 to gather information on the referencing private UDTF. In one embodiment, the metadata table 117 contains a collection of records (one record for each UDTF column) corresponding to each private UDTF. The records contain annotations or metadata that allows the metadata processor 141 to construct a query directly against database tables and return the results back to the calling private UDTF in the required format (e.g., order of columns). For example, as defined in Table 2, the metadata processor 141, as specified in lines 002-004, the SCORES_PRIVATE UDTF expects the metadata processor 141 to return the query results in following columnar order: ID, NAME and SCORE. The metadata table 117 and the metadata processor's 141 use of the table 117 is described in more detail with reference to FIGS. 3 and 4.

Referring still to FIG. 2, in accordance with the discussion above, the metadata processor 114 is shown as the linkage between private UDTFs 114 and the data sources, which are the relational database 111, flat files 115 or any other suitable data source 116. Operations related to handling query requests with the software components described with reference to FIG. 2 are described below with reference to FIG. 3.

Figure 3:
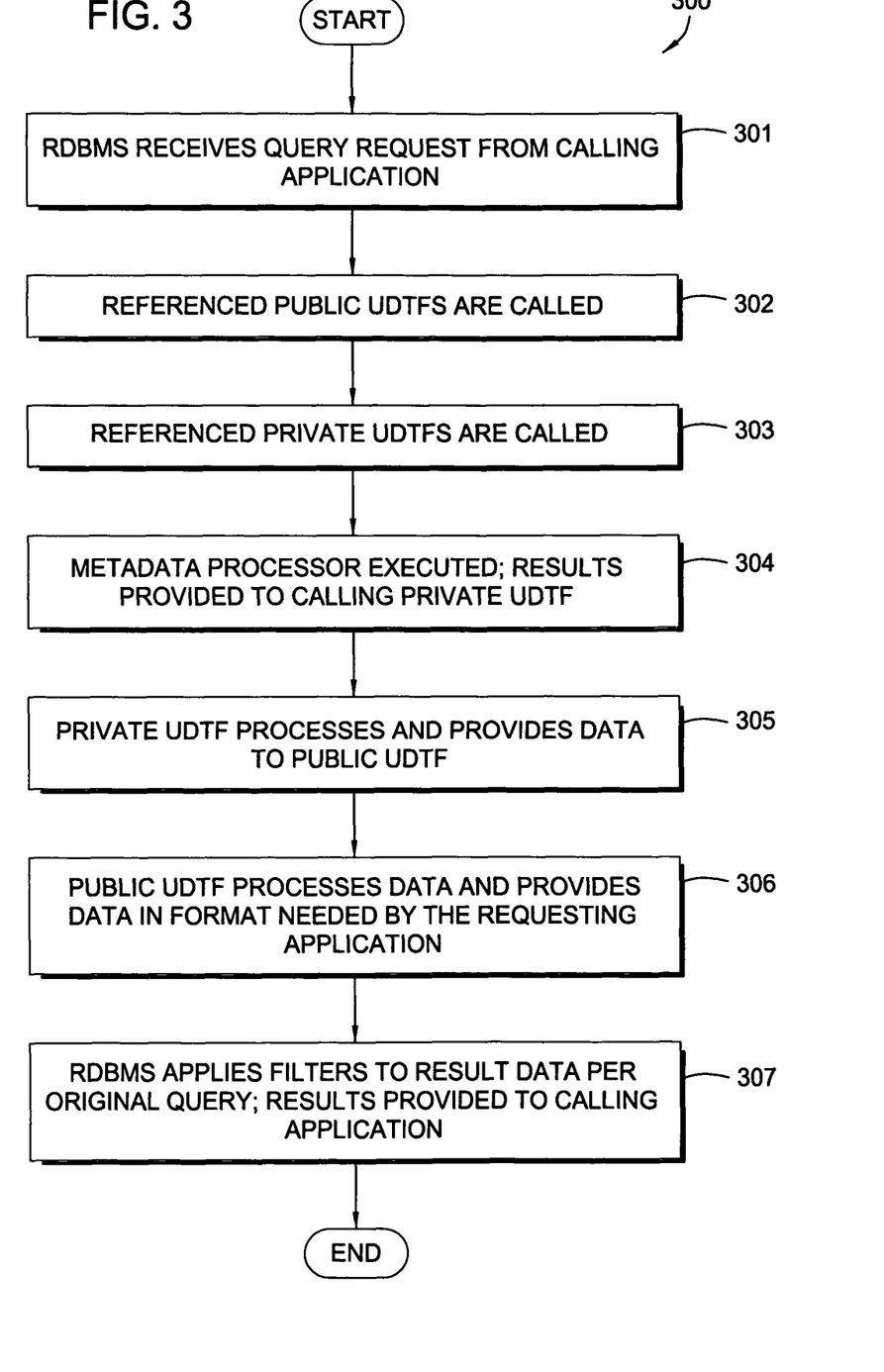
FIG. 3 is a flow chart illustrating exemplary operations for handling query requests, according to one embodiment of the present invention.

FIG. 3 is a flow chart illustrating exemplary operations for handling query requests, according to one embodiment of the present invention. Operations 300 begin at step 301 as the RDBMS receives a query process submitted by an application, such as a query building application 120. It should be noted that according to one embodiment of the present invention, only public UDTFs are accessible to calling applications. Accordingly, the submitted query contains references to one or more public UDTFs instead of conventional tables. The RDBMS parses the submitted query and identifies the referenced public UDTF, which itself (based on its definition) references a corresponding private UDTF. In turn, at step 304 the corresponding private UDTF (referenced by the public UDTF) calls the metadata processor 141, which performs operations described with reference to FIG. 4.

Figure 4:
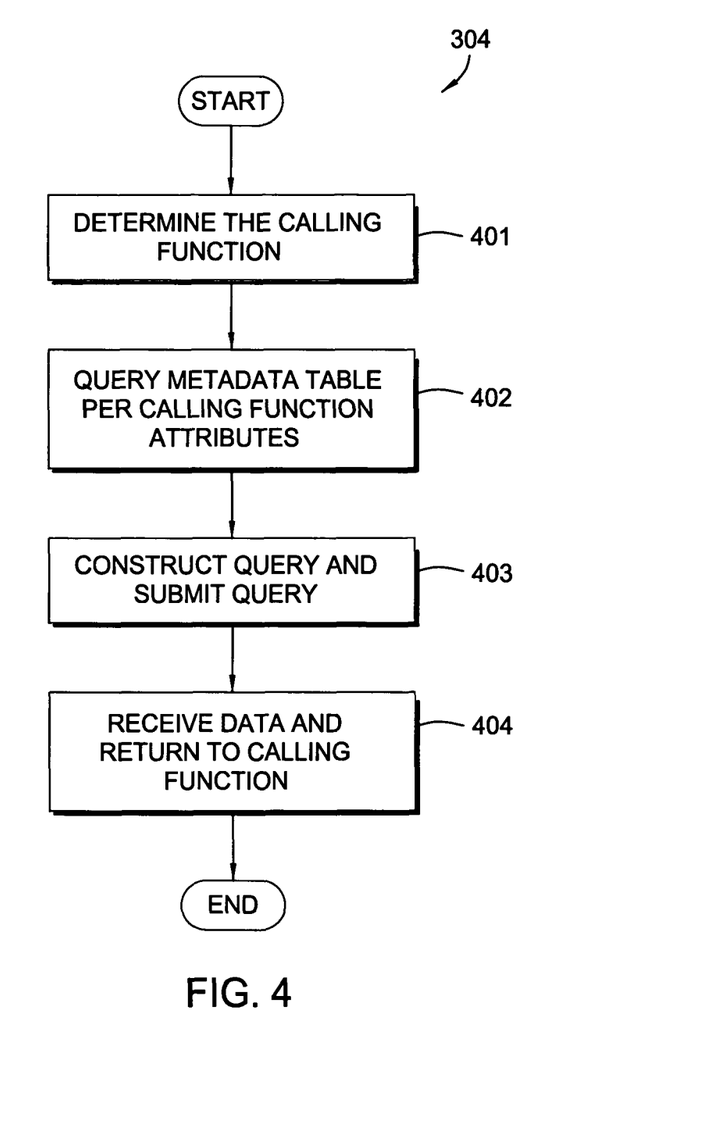
FIG. 4 is a flow chart illustrating exemplary operations performed by the metadata processor for a query request, according to one aspect of the present invention.

FIG. 4 is a flow chart illustrating exemplary operations 304 performed by the metadata processor 141 for a query request, according to one aspect of the present invention. Operations 304 commence at step 401 as the metadata processor 141 determines the calling function. For one embodiment, the calling function is always a private UDTF. Next, at step 402 the metadata processor 141 queries the metadata table 117 for all records pertaining to the calling private UDTF. Based on the metadata gathered from the queried records, the metadata processor 141 constructs an appropriate query directly against database tables at step 403 and submits the query to the RDBMS. At step 404 the metadata processor receives query results from the RDBMS and provides the resultant data set to the calling private UDTF.

Referring back to FIG. 3 now, at step 305 the private UDTF receives and processes the data set provided by the metadata processor 141 and provides the data set to the corresponding public UDTF. The private UDTF processes the data by adding column identifiers, such as column headings, to the data set. At step 306 the public UDTF receives the data set from the private UDTF and processes the data set in preparation for providing the data set to the calling application. For example, the public UDTF processes the data by eliminating extra columns (any of the ninety columns that were not used) and converts the data to the proper datatype.

Finally, at step 307 the RDBMS applies filters to the data, wherein the filters are specified by the original query request (e.g., WHERE clause) and provides the data to the calling application. Stated another way, the RDBMS applies filters to the data set and then provides the filtered data set in response to the original query request received in step 301.

To further describe the operations described with reference to FIGS. 3 and 4, Tables 3-13, shown below, contain an exemplary database table (SCORES), private UDTF, public UDTF and a portion of the metadata table 117 containing records pertaining to the private UDTF. Each of these components correspond to each other and are configured according to embodiments of the present invention to provide calling applications access to data residing in the SCORES table.

TABLE 3

A portion of the SCORES table
Table Name: SCORES

| ID | NAME | SCORE |
|----|------|-------|
| 52 | AMY | 10 |
| 53 | BOB | 8 |
| 54 | CAROL | 9 |
| 55 | DAN | 11 |

It can be seen that the SCORES table, shown above, has three columns: ID, NAME and SCORE. Records representing four individuals with ID's ranging from 52 through 55 are shown. Suppose a query is submitted from a calling environment in order to retrieve the data residing in the SCORES table. The discussion below describes the various components of the system and the process which follows operations 300 described earlier. Table 4, shown below contains an example query that is submitted by a calling application (i.e., RDBMS user).

TABLE 4

Query from Calling Application

001 SELECT *
002 FROM SCORES
003 WHERE SCORE > 9

According to embodiments of the present invention, rather than allow direct access to the SCORES table, the system is configured to accept external query requests against the SCORES_PUBLIC UDTF to provide data that resides in the SCORES table. In fact, RDBMS users do not have visibility or access to the SCORES table. Instead, they have access to SCORES_PUBLIC, which corresponds to the SCORES table. Sample code that is used for registering SCORES_PUBLIC in the RDBMS is provided below in Table 5.

TABLE 5

Exemplary definition for SCORES_PUBLIC UDTF

001 CREATE FUNCTION SCORES_PUBLIC( )
002   RETURNS TABLE ( ID INTEGER,
003       NAME VARCHAR(255),
004       SCORE INTEGER)
005   LANGUAGE SQL
006   READS SQLDATA
007   NO EXTERNAL ACTION
008   NOT DETERMINISTIC
009   RETURN
010     SELECT INTEGER(SCORES_PRIVATE.ID),
011   SCORES_PRIVATE.NAME,
012     INTEGER(SCORES_PRIVATE.SCORE)
013   FROM SCORES_PRIVATE( )

Lines 002-004 from Table 5 shows that SCORES_PUBLIC is configured to return an array (that appears to calling programs as a table) that has three columns: ID, NAME and SCORE. Lines 010-013 exhibit the SCORES_PUBLIC UDTF referencing the SCORES_PRIVATE UDTF via a query comprising three columns of data. Table 6, shown below, provides code used for registering the SCORES_PRIVATE UDTF.

TABLE 6

Exemplary definition for SCORES PRIVATE

001 CREATE FUNCTION SCORES_PRIVATE( )
002   RETURNS TABLE(ID VARCHAR(5),
003     NAME VARCHAR(255),
004     SCORE VARCHAR(5),
005     DONOTUSE1 VARCHAR(1),
006     DONOTUSE2 VARCHAR(1),
007     DONOTUSE3 VARCHAR(1),
   . . .
091     DONOTUSE87 VARCHAR(1))
092       EXTERNAL NAME 'annotation_processor.TF1'
093     LANGUAGE JAVA When referenced, the SCORES_PRIVATE UDTF invokes the metadata processor, as listed on line 092 of Table 6. In turn, the metadata processor queries the metadata table for records describing the private UDTF and then forms and submits a query directly against the underlying tables. Table 7, shown below, presents a portion of the metadata table that contains records pertaining to the SCORES_PRIVATE UDTF.

TABLE 7

Portion of metadata table pertaining to SCORES PRIVATE

| FUNCTION_NAME | COLUMN_NUMBER | FULL_DB_COL |
|---|---|---|
| SCORES_PRIVATE | 0 | SCORES.ID |
| SCORES_PRIVATE | 1 | SCORES.NAME |
| SCORES_PRIVATE | 2 | SCORES.SCORE |

The above records contain information that the metadata processor relies upon to construct a suitable query for directly retrieving data from the SCORES database table. In this embodiment, the metadata table is configured to have one record for each column that is to be returned. Each record contains the name of the referencing private UDTF, the position in which the column appears in the result set (e.g., the SCORE column appears last, so it has the highest COLUMN_NUMBER). The metadata processor constructs and submits the query against the metadata table, as listed on lines 001-004 shown in Table 8 below.

TABLE 8

Query Against Metadata Table

| | |
|---|---|
| 001 | SELECT FULL_DB_COL |
| 002 | FROM METADATA |
| 003 | WHERE FUNCTION_NAME = 'SCORES_PRIVATE' |
| 004 | ORDER BY COLUMN_NUMBER. |

The result set shown below in Table 9 corresponds to the query of Table 8. The metadata processor utilizes the information regarding the SCORES_PRIVATE UDTF in the result set to construct a query. For instance, the result set below shows that three columns of data from the SCORES table are to be retrieved. Specifically, the ID, NAME and SCORE columns are to be retrieved in a specified order.

TABLE 9

Results Corresponding to Query Against Metadata Table

SCORES.ID
SCORES.NAME
SCORES.SCORE

For this example, a WHERE clause is not provided, so all the rows from the SCORES table are retrieved. It should be understood that for purposes of clarity and brevity, the current example is purposely kept simple. More complex implementations of the metadata table are envisioned. For instance, other embodiments may feature a metadata table with additional columns containing special instructions (i.e., instructions that complement the predefined logic used by the metadata processor) for the metadata processor in order to control the query syntax generated by the metadata processor to directly access the database tables. The special instructions may be used to direct the metadata processor to utilize specific joins between certain tables, precompute aggregations, provide additional filters, etc.

Referring back to the current example, the metadata processor utilizes the results shown in Table 9 and constructs a query that directly accesses the SCORES database table; the results associated with the constructed query are shown below in Table 10.

TABLE 10

Results Corresponding to Query Constructed by Metadata processor

| 52 | AMY | 10 | Null | null | ... (repeat 85 more |
| 53 | BOB | 8 | Null | null | null columns) |
| 54 | CAROL | 9 | Null | null | |
| 55 | DAN | 11 | Null | null | |

The results shown in Table 10 are returned by the RDBMS to the metadata processor, and, in turn, the metadata processor relays the results to the SCORES_PRIVATE UDTF. It should be noted that all the data in all the columns is provided in the character datatype. For instance, the SCORE column contains numerical data, but at this stage the SCORE column is still of the character datatype. It should also be noted that the column identifiers are not included. Next, the metadata processor relays the results to the SCORES_PRIVATE UDTF which then processes the results. Table 11, shown below, presents the data set after it has been processed by SCORES_PRIVATE.

TABLE 11

Data Set Processed by SCORES PRIVATE

| ID | NAME | SCORE | DONOTUSE 1 | DONOTUSE 2 | DONOTUSE... |
|---|---|---|---|---|---|
| 52 | AMY | 10 | Null | Null | ... (repeat 85 more |
| 53 | BOB | 8 | Null | Null | null columns) |
| 54 | CAROL | 9 | Null | Null | |
| 55 | DAN | 11 | Null | Null | |

As seen in Table 11 above, SCORES_PRIVATE provides the data set with column identifiers and relays the modified data set to SCORES_PUBLIC. As shown below in Table 12, SCORES_PUBLIC removes the eighty seven unused columns.

TABLE 12

Data Set Processed by SCORES PUBLIC

| ID | NAME | SCORE |
|---|---|---|
| 52 | AMY | 10 |
| 53 | BOB | 8 |
| 54 | CAROL | 9 |
| 55 | DAN | 11 |

In addition to eliminating the unused columns, SCORES_PUBLIC also converts the data within the data set to the proper datatype. Accordingly, the ID and SCORE columns are converted to the numerical datatype. Finally, the RDBMS will apply the WHERE clause from the original query statement (line 003, Table 4) and the final result set shown in Table 13 (below) will be returned to the calling application.

TABLE 13

Final Data Set

| ID | NAME | SCORE |
|---|---|---|
| 52 | AMY | 10 |
| 55 | DAN | 11 |

According to embodiments of the present invention, the system described above (comprising public UDTFs, private UDTFs and a metadata processor) can be configured to provide secure access to data. For instance, the functionality offered by the system can be extended to provide row-level and cell-level access to data residing in data repositories. In one embodiment, the system is configured to intercept query requests and then modify the respective queries (or execute different queries altogether) to provide only appropriate data to the requesting user—appropriateness of the data is determined by predefined user privileges.

To further describe functionality related to providing secure access to data, Tables 14-20, shown below, contain modified versions of the exemplary database table SCORES, public UDTF SCORES_PUBLIC and private UDTF SCORE_PRIVATE. A modified version of the metadata table 117 is also provided. Each of these components correspond to each other and are configured according to embodiments of the present invention to provide secure access to data residing in the SCORES table.

TABLE 14

A portion of the SCORES table
Table Name: SCORES

| ID | NAME | POSITION | SCORE |
|----|------|----------|-------|
| 52 | AMY | ANALYST | 10 |
| 53 | BOB | MANAGER | 8 |
| 54 | CAROL | VICE PRESIDENT | 9 |
| 55 | DAN | ANALYST | 11 |
| 56 | EVAN | ANALYST | 8 |

The modifications to the SCORES table include the addition of the POSITION column and the addition of a record for a user named EVAN, with the ID column value of "56". The definitions of the corresponding SCORES_PUBLIC and SCORES_PRIVATE UDTFs have also been modified as shown below in Tables 15 and 16.

TABLE 15

Definition of SCORES_PUBLIC UDTF

| | |
|---|---|
| 001 | CREATE FUNCTION SCORE_PUBLIC( ) |
| 002 | RETURNS TABLE ( ID INTEGER, |
| 003 | NAME VARCHAR(255), |
| 004 | POSITION VARCHAR(20), |
| 005 | SCORE INTEGER) |
| 006 | LANGUAGE SQL |
| 007 | READS SQLDATA |
| 008 | NO EXTERNAL ACTION |
| 009 | NOT DETERMINISTIC |
| 010 | RETURN |
| 011 | SELECT INTEGER(SCORE_PRIVATE.ID), |
| 012 | SCORE_PRIVATE.NAME, |
| 013 | SCORE_PRIVATE.POSITION, |
| 014 | INTEGER(SCORE_PRIVATE.SCORE) |
| 015 | FROM SCORE_PRIVATE( ) |

In order to accommodate the POSITION column, lines 004 and 013 have been added to the definition of the SCORES_PUBLIC UDTF shown above in Table 14. Correspondingly, the definition of the SCORES_PRIVATE UDTF has also been updated with the addition of a POSITION column, as listed below in Table 15.

TABLE 15

Definition of SCORES_PRIVATE UDTF

| | |
|---|---|
| 001 | CREATE FUNCTION SCORE_PRIVATE( ) |
| 002 | RETURNS TABLE(ID VARCHAR(5), |
| 003 | NAME VARCHAR(255), |
| 004 | POSITION VARCHAR(20), |
| 005 | SCORE VARCHAR(5), |
| 006 | DONOTUSE1 VARCHAR(1), |
| 007 | DONOTUSE2 VARCHAR(1), |
| 008 | VARCHAR(1), |
| | . . . |
| 092 | DONOTUSE87 VARCHAR(1)) |
| 093 | EXTERNAL NAME 'metadata_processor.TF1' |
| 094 | LANGUAGE JAVA |
| 095 | PARAMETER STYLE DB2GENERAL |
| 096 | NOT DETERMINISTIC |

According to one embodiment of the invention, in order to provide row-level security for tables, a corresponding "security" table is provided. The security table 118 includes information pertaining to the user privileges for each row. For example, for the SCORES table, a corresponding SCORES_SECURITY table is provided, and is presented below in Table 16.

TABLE 16

A portion of the SCORES_SECURITY Table

| ID | NAME |
|----|------|
| 52 | AMY, BOB, CAROL, DAN, EVAN, FRED |
| 53 | BOB, CAROL |
| 54 | CAROL |
| 55 | AMY, BOB, CAROL, DAN, EVAN, FRED |
| 56 | AMY, BOB, CAROL, DAN, EVAN, FRED |

There is a one to one relationship between the SCORES table and the SCORES_SECURITY table—i.e., for each row in the SCORES table there is a corresponding row in the SCORES_SECURITY table. Further, each row of the SCORES_SECURITY table lists the users that have access (or particular privileges) to the corresponding row in the SCORES table.

Both the SCORES and the SCORES_SECURITY table are configured with the ID column as their primary key. Accordingly, these two tables can be joined on the ID column. For instance, the SCORES_SECURITY table shows that BOB and CAROL are the only users that are listed in the row with an ID of "53". Therefore, by joining the SCORES and SCORES_SECURITY tables, it can be determined that only BOB and CAROL have access to the SCORES table row with an ID of "53".

As described earlier (with respect to FIG. 2) query requests submitted by users reference public UDTFs, such as the SCORES_PUBLIC UDTF. In turn, the public UDTFs reference corresponding private UDTFs. Next, the private UDTFs invoke the metadata processor. The process employed by the metadata processor to generate a query that provides secure access to data is described in FIG. 5.

Figure 5:
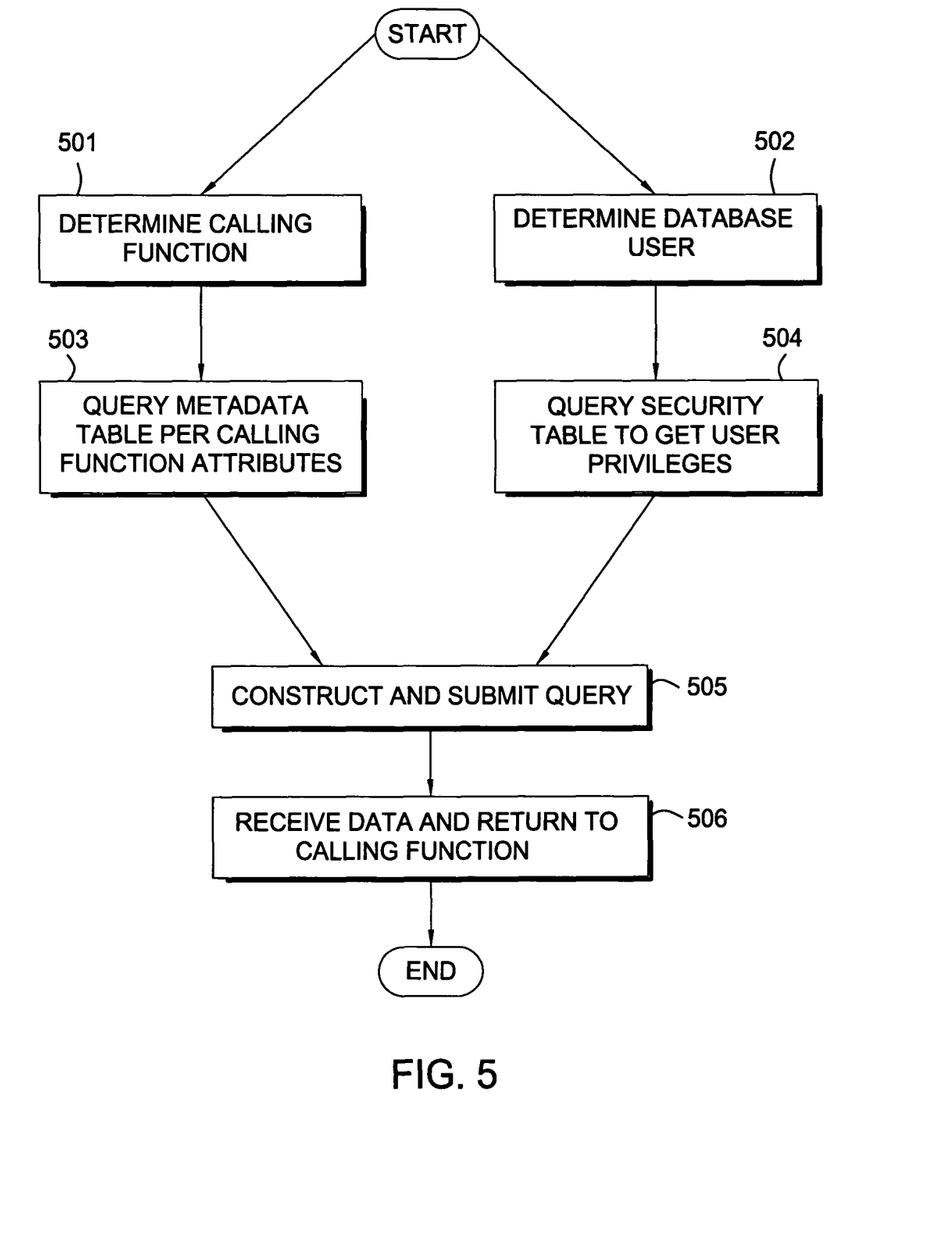
FIG. 5 is a flow chart illustrating exemplary operations performed by the metadata processor for a query request, according to another aspect of the present invention.

FIG. 5 is a flow chart illustrating exemplary operations 500 performed by the metadata processor 141 for a query request, according to an embodiment that is directed to providing secure access to data. Operations 500 commence at step 501 as the metadata processor 141 determines the calling function. For one embodiment, the calling function is a private UDTF. At step 502 (which can be performed concurrently with step 501) the name of the database user is determined. The metadata processor 141 queries the metadata table 117 for all records pertaining to the calling private UDTF, at step 503. At step 504, a security table is queried to retrieve privileges for the database users.

Based on the metadata gathered, the metadata processor 141 constructs an appropriate query directly against database tables at step 504 and submits the query to the RDBMS. At step 505 the metadata processor receives query results from the RDBMS and provides the resultant data set to the calling private UDTF. To further describe operations 500, sample queries related to the SCORES table are provided below.

Suppose a database query is submitted for retrieving data from the SCORES table. Further suppose the database query is submitted by a particular database user through a query building application 121. Upon logging onto the query building application 121, the user's identity is known and available to the system for the duration of the query building session. In other words, the identity of the user submitting the query request is known. The query request is routed through the appropriate public and private UDTFs as described above. Also as described above, direct querying of the underlying table, such as SCORES, is done by the metadata processor. Rather than query only the SCORES table, the metadata processor generates a query that joins both the SCORES table and the SCORES_SECURITY table on the ID column. In addition to joining SCORES and SCORES_SECURITY, the query generated by the metadata processor also incorporates the privileges of the database user issuing the query.

For instance, suppose the user CAROL is issuing the query shown below in Table 17, lines 001-003. Just as described above with respect to earlier examples, a query referencing a public UDTF causes a corresponding private UDTF to be referenced, which, in turn, invokes the metadata processor.

TABLE 17

Query Submitted by Carol

Submitted SQL:

| 001 | SELECT * |
| 002 | FROM SCORES_PUBLIC |
| 003 | WHERE SCORE > 6 |

Corresponding SQL generated by the metadata processor:

| 004 | SELECT SCORES.* |
| 005 | FROM SCORES, SCORES_SECURITY |
| 006 | WHERE SCORES.SCORE > 6 |
| 007 | AND SCORES.ID = SCORES_SECURITY.ID |
| 008 | AND SCORES_SECURITY.NAME CONTAINS "CAROL" |

Query Results:

| ID | NAME | POSITION | SCORE |
| --- | --- | --- | --- |
| 52 | AMY | ANALYST | 10 |
| 53 | BOB | MANAGER | 8 |
| 54 | CAROL | VICE PRESIDENT | 9 |
| 55 | DAN | ANALYST | 11 |
| 56 | EVAN | ANALYST | 8 |

Table 17, shown above, lists the original query as it is submitted by CAROL on lines 001-003. Lines 004-008 list the corresponding query generated by the metadata processor. The join between SCORES and SCORES_SECURITY can be seen on line 007. The join to the SCORES_SECURITY table ensures that the user submitting the query (CAROL in this case) is authorized to view every record in the result set. Line 008, which lists the CONTAINS "CAROL" syntax filters out each record that CAROL is not authorized to view. In this example, CAROL is authorized to view all the records, as seen in the query results shown in Table 17.

It should be understood if a particular query is submitted by different users having different privileges, the two respective result sets will be different. Table 18, shown below, lists the query described in Table 17 and the corresponding query generated by the metadata processor. For this example, BOB is the user submitting the query.

TABLE 18

Query Submitted by Bob

Submitted SQL:

| 001 | SELECT * |
| 002 | FROM SCORES_PUBLIC |
| 003 | WHERE SCORE > 6 |

Corresponding SQL generated by the metadata processor:

| 004 | SELECT SCORES.* |
| 005 | FROM SCORES, SCORES_SECURITY |
| 006 | WHERE SCORES.SCORE > 6 |
| 007 | AND SCORES.ID = SCORES_SECURITY.ID |
| 008 | AND SCORES_SECURITY.NAME CONTAINS "BOB" |

Query Results:

| ID | NAME | POSITION | SCORE |
| --- | --- | --- | --- |
| 52 | AMY | ANALYST | 10 |
| 53 | BOB | MANAGER | 8 |
| 55 | DAN | ANALYST | 11 |
| 56 | EVAN | ANALYST | 8 |

It should be noted that line 007 in Table 18 requires that BOB is listed in the SCORES_SECURITY table for a particular row in order to allow the corresponding SCORES row to be included in the result set. Accordingly, the query results shown in Table 18 correspond to the records for which BOB has privileges. It can be seen in Table 16 that CAROL and BOB have different privileges for the rows in the SCORES table; this translates to different queries generated by the metadata processor and, correspondingly, to different query results.

While the discussion above has focused on providing row-level security, other embodiments of the present invention may be configured to provide cell-level security. As mentioned earlier, cell-level security allows for assigning user privileges to data residing in a particular column of a particular row of a table. Table 19, shown below, presents a modified version of the metadata table (seen above in Table 7) configured to support cell-level security. Example queries demonstrating this functionality are also shown below.

TABLE 19

Metadata configured to support cell-level security

| FUNCTION_NAME | COLUMN NUMBER | FULL_DB_COL | NAME | LOGIC |
| --- | --- | --- | --- | --- |
| SCORE_PRIVATE | 0 | SCORES.ID | AMY | "POSITION = ANALYST'" |
| SCORE_PRIVATE | 0 | SCORES.ID | BOB | "POSITION IN ('MANAGER', 'ANALYST')" |
| SCORE_PRIVATE | 0 | SCORES.ID | CAROL | ALL |
| SCORE_PRIVATE | 0 | SCORES.ID | DAN | "POSITION = 'ANALYST'" |
| SCORE_PRIVATE | 0 | SCORES.ID | EVAN | "POSITION = ANALYST'" |
| SCORE_PRIVATE | 1 | SCORES.NAME | AMY | "POSITION = ANALYST'" |
| SCORE_PRIVATE | 1 | SCORES.NAME | BOB | "POSITION IN ('MANAGER', 'ANALYST')" |
| SCORE_PRIVATE | 1 | SCORES.NAME | CAROL | ALL |
| SCORE_PRIVATE | 1 | SCORES.NAME | DAN | "POSITION = ANALYST'" |
| SCORE_PRIVATE | 1 | SCORES.NAME | EVAN | "POSITION = ANALYST'" |
| SCORE_PRIVATE | 2 | SCORES.SCORE | AMY | "POSITION = ANALYST'" |

TABLE 19-continued

Metadata configured to support cell-level security

| FUNCTION_NAME | COLUMN NUMBER | FULL_DB_COL | NAME | LOGIC |
|---|---|---|---|---|
| SCORE_PRIVATE | 2 | SCORES.SCORE | BOB | "POSITION IN ('MANAGER', 'ANALYST')" |
| SCORE_PRIVATE | 2 | SCORES.SCORE | CAROL | ALL |
| SCORE_PRIVATE | 2 | SCORES.SCORE | DAN | "POSITION = ANALYST'" |
| SCORE_PRIVATE | 2 | SCORES.SCORE | EVAN | "ID = 56" |

It should be noted in Table 19 (above) that a separate row is provided in the metadata table for each distinct combination of FULL_DB_COLUMN and NAME. Additionally, the metadata table includes a "LOGIC" column that instructs the metadata processor to include additional logic in the generated query (e.g., an additional component of the WHERE clause). For instance, when a query relating to the SCORES.ID column is submitted by AMY, the first metadata table record instructs the metadata processor to only return records from SCORES where the POSITION value is ANALYST for the respective records. In other words, AMY should only be allowed to receive query results pertaining to ANALYSTS—she should not be able to receive query results that include information about MANAGERs and VPs.

It should also be noted that EVAN has access to SCORES.SCORE column for only one row. The last line of Table 19 specifies that EVAN is allowed to view the contents of the SCORE column from the SCORES only for the row with an ID value of "56". An example query demonstrating this functionality is provided in Table 20 below, which lists a query submitted by EVAN.

TABLE 20

Query Submitted by EVAN

Submitted SQL:

```
001    SELECT *
002      FROM SCORES_PUBLIC
003      WHERE SCORE > 6
```

Corresponding SQL generated by the metadata processor:

```
004    SELECT ID,
005           NAME,
006           POSITION,
007           SCORE (IF ID = 56 THEN SCORE ELSE
                  "NO ACCESS")
008      FROM SCORE_PUBLIC
009      WHERE SCORE > 6
010        AND POSITION = 'ANALYST';
```

Query Results:

| ID | NAME | SCORE |
|---|---|---|
| 52 | AMY | NO ACCESS |
| 55 | DAN | NO ACCESS |
| 56 | EVAN | 8 |

It can be seen on lines 004-007 of Table 20 that the metadata processor has translated the original "*", which denotes all columns of SCORE_PUBLIC, into a SELECT statement that lists each column separately. The additional logic listed on line 007 is related to the cell-level security restriction specifying that EVAN only be allowed to view the contents of the SCORE column for rows where ID="56". It should be noted that the syntax provided above is representative of one embodiment only. Other embodiments my implement this functionality using different approaches, such as using in-line views.

CONCLUSION

A system comprising UDTFs and a metadata processor are configured to provide security based functionality, including row-level and column level security. In terms of UDTFs, by providing the ability to utilize the same number of columns for all private UDTFs, thereby standardizing all private UDTFs, and providing the ability to invoke only one piece of code (the metadata processor) to form suitable queries for any private UDTF, a simple and effective approach to utilizing UDTFs in a distributed database environment is presented. Using this approach, a single piece of code is used to couple all private UDTFs with their corresponding underlying tables.

As described above, one aspect of one embodiment of the present invention is the contents of the metadata table. Similarly the contents of security tables are one aspect of one embodiment of the present invention. Those skilled in the art will acknowledge that these tables can be configured to contain additional information to facilitate additional functionality provided by the metadata processor. Additionally, embodiments of the present invention are envisioned that provide programmatic tools for automatically populating the metadata table and security tables.

While the examples above have featured queries that access data from tables in only one schema, those skilled in the art will appreciate that embodiments of the present invention can support multiple schemas residing in different databases in a distributed database environment. In fact, implementing the methods described herein is even more advantageous in an environment employing numerous schemas in various databases, with each schema containing numerous tables with large amounts of data.

The foregoing examples reference medical research environments. However, these examples are provided merely to illustrate embodiments and particular implementations. More broadly, embodiments of the invention are contemplated for any data environment including, for example, transactional environments, financial research environments, accounting environments, legal environments and the like.

It should be noted that any reference herein to particular values, definitions, programming languages and examples is merely for purposes of illustration. Accordingly, the invention is not limited by any particular illustrations and examples. Furthermore, while the foregoing is directed to embodiments of the present invention, other and further embodiments of the invention may be devised without departing from the basic scope thereof, and the scope thereof is determined by the claims that follow.

What is claimed is:

1. A computer implemented method performed by one or more computer processors, the method comprising:
   providing a calling application that submits a first query which is created by a user;
   receiving the first query, which references a first user-defined table function (UDTF);
   responsive to the received first query, calling the referenced first UDTF;
   calling a second user-defined table function referenced by the called first UDTF; and
   calling a metadata processor referenced by the called second UDTF for performing operations related to providing data to the second UDTF, wherein the operations comprise:
      submitting a second query to gather attributes comprising security attributes of the user and attributes of the second UDTF;
      receiving query results which correspond to the second query;
      using the query results which correspond to the second query, forming a third query based on the attributes comprising security attributes of the user and attributes of the second UDTF and by operation of the one or more computer processors;
      submitting the third query against the table; and
      providing query results which correspond to the third query to the second UDTF, wherein the second UDTF is configured to add column headings to the query results, and wherein the first UDTF is configured to eliminate unused columns and convert the query results to a proper data type.

2. The computer implemented method of claim 1, further comprising, after providing the query results to the second UDTF, providing the query results from the second UDTF to the first UDTF.

3. The computer implemented method of claim 2, further comprising:
   processing the query results received by the first UDTF from the second UDTF; and
   providing processed query results to the calling application.

4. The computer implemented method of claim 3, wherein processing the query results comprises:
   converting data within the query results corresponding to the third query to another datatype; and
   providing column headings.

5. The computer implemented method of claim 1, further comprising including in the third query filters corresponding to the user's privileges to particular rows of the table.

6. The computer implemented method of claim 1, further comprising including in the third query filters corresponding to access privileges of the user to particular cells of the table, wherein cells are particular columns in particular rows.

7. The computer implemented method of claim 1, wherein the second query references a metadata table and a security table.

* * * * *